United States Patent [19]

Iwaide

[11] 4,172,986
[45] Oct. 30, 1979

[54] VIBRATOR

[75] Inventor: Tsuneo Iwaide, Yokosuka, Japan

[73] Assignee: Okura Electric Industry Company, Ltd., Tokyo, Japan

[21] Appl. No.: 912,768

[22] Filed: Jun. 5, 1978

[30] Foreign Application Priority Data

Apr. 21, 1978 [JP] Japan .............................. 53-52144[U]

[51] Int. Cl.² ............................................. H02K 7/00
[52] U.S. Cl. .................................... 310/81; 310/75 D
[58] Field of Search ...................... 310/81, 75 D, 115; 74/61, 81

[56] References Cited

U.S. PATENT DOCUMENTS

| | | | |
|---|---|---|---|
| 2,940,326 | 6/1960 | Meyer | 310/81 X |
| 2,945,970 | 7/1960 | Nordegren | 310/81 |
| 4,084,445 | 4/1970 | Erwin | 74/61 |

Primary Examiner—Donovan F. Duggan
Attorney, Agent, or Firm—Colton & Stone, Inc.

[57] ABSTRACT

There is disclosed a vibrator equipped with a hollow motive shaft penetrating through a rotor of an electric motor to project front and rear of the motor and a vibrating shaft arranged in the hollow portion of the motive shaft in concentric and rotatable relations to rotate in the same direction as the motive shaft at a higher speed than the same through a rotation transmission mechanism interposed between said two shafts.

4 Claims, 4 Drawing Figures

VIBRATOR

BACKGROUND OF THE INVENTION

The well known vibrator hitherto used for the conventional concrete placing work comprises primarily such an electric motor, so called "double headed motor", that have a motive shaft penetrating through the rotor to project front and rear of the motor and is adapted for the whole body including the motor to become a vibrating body by means of the eccentric weights attached to both ends of the projecting motive shaft. In such vibrator, since the number of rotations of the motor is ordinarily 3000 r.p.m. or so, it is to be speeded up to an extent of 9000 r.p.m. when in vibration by the use of a separately provided frequency converter(s), generally called "vibration amplifier". The motive shaft rotating at such high speed exerts inevitably turning impacts of the eccentric weights directly onto the bearing portions thereof resulting in decreasing the ultimate useful life of the bearing into only 2~3 months.

SUMMARY OF THE INVENTION

This invention has been primarily directed to extend the useful life of the bearing used for the vibrating shafts as mentioned above, for the purpose of which the present vibrator is characterized by comprising a vibrating shaft having an eccentric weight respectively at its both ends and arranged in the hollow portion of a hollow motive shaft in place of the conventional vibrating motive shaft, and a rotation-transmitting mechanism interposed between the motive shaft and the vibrating shaft to transmit the rotation of the motive shaft to the vibrating shaft in such a manner that both the shafts rotate in the same direction and the latter rotates more speedy than the former. According to such construction, the bearing portions of the vibrating shaft may be undergone far less vibration impacts than that of conventional ones despite of the same vibration amplitude, yet may be elimineted the need for any frequency converters of very high cost used in the conventional vibrators.

DETAILED DESCRIPTION OF THE PREFERRED EMBODIMENTS

Figure 1:
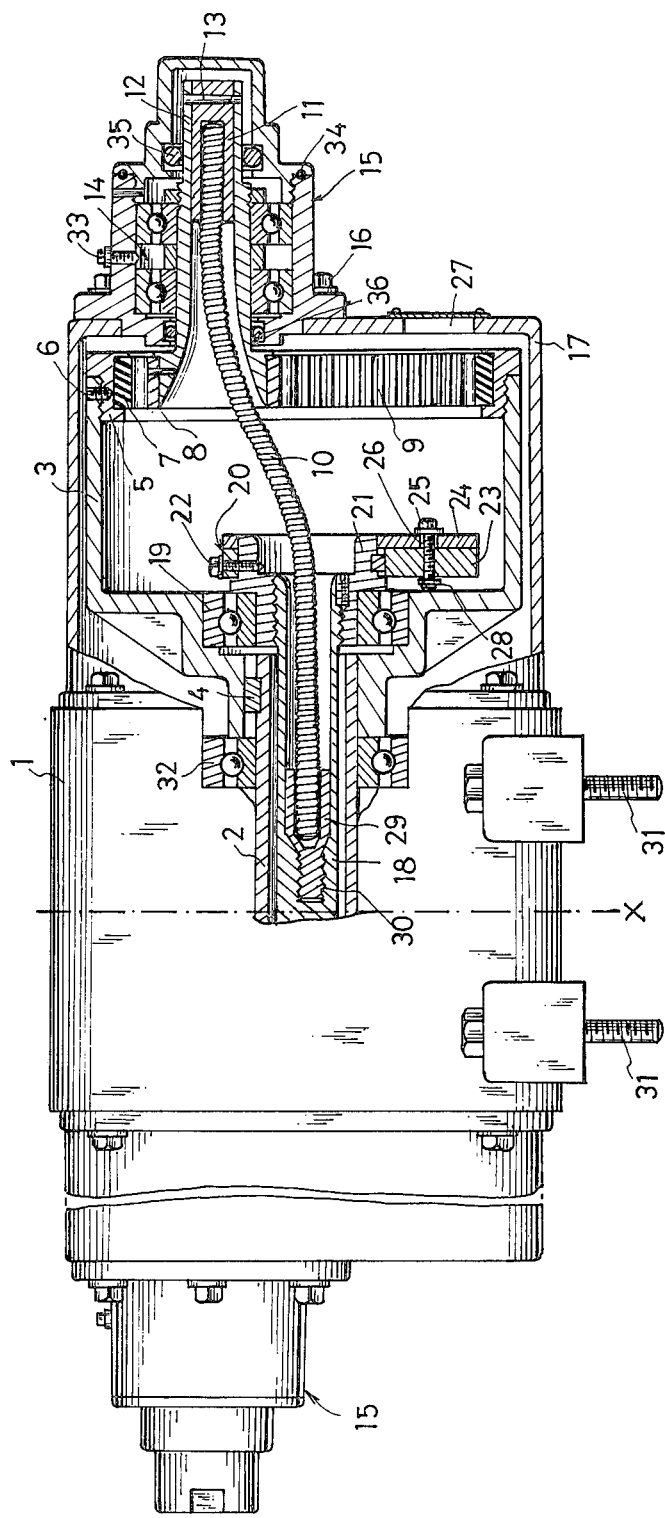
FIG. 1 is a fragmentary vertical sectional elevation of a preferred embodiment of the invention.
Figure 2:
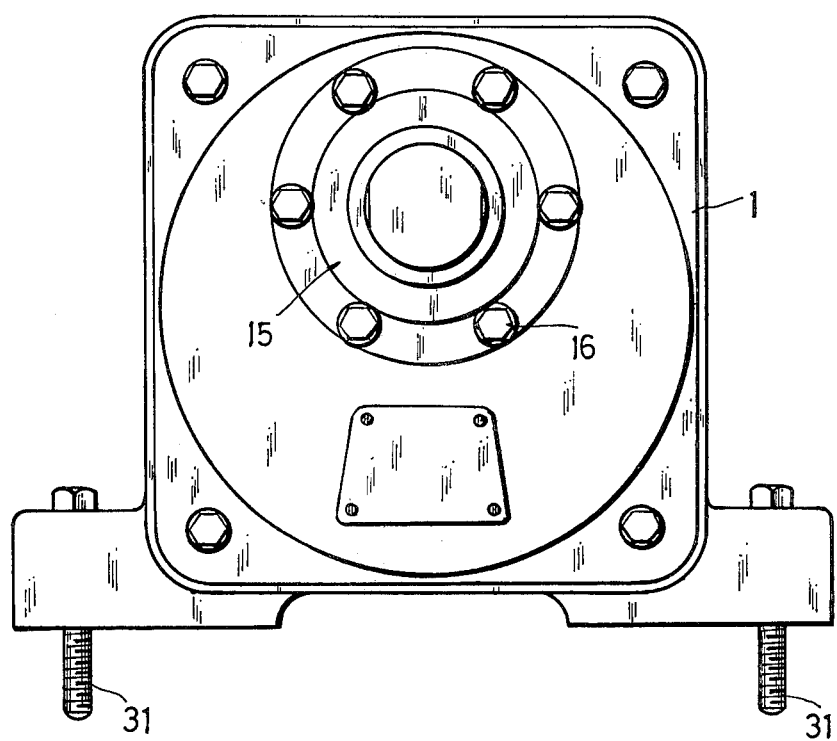
FIG. 2 is a front elevational view of the invention.
Figure 3:
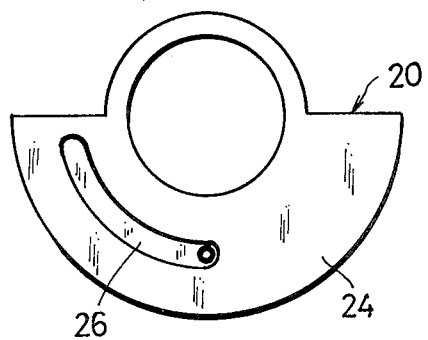
FIG. 3 is a front elevational view of the eccentric weight employed in the same.

In the Figures, 1 is a three-phase A. C. motor. 2 is a hollow motive shaft penetrating through the rotor of the motor to project front and rear of the motor, on which front and rear ends an annular transmitting member 3 is respectively fitted fixedly (the member 3 on the rear end is not shown in the Figure; since the elements denoted hereinafter by the reference numerals 4~36 are in pairs exclusive of part 18 and disposed symmetrically on front and rear, or right and left, sides of the center line X of the vibrator in FIG. 1, the explanation on the rear side ones are omitted) in a concentrical relation with the shaft 2. 4 is a coupling kee. Screwed fixedly into the inner surface of the front end of the transmitting member 3 through a screw 6 is an another annular member 5 in this instance, into inner surface. portion of which a timing belt 7 of an internal gear form is fitted fixedly by such means as adhesion or the like. The timing belt may be ordinarily made of hard elastic material, such as hard rubber or synthetic rubber. 8 is an inscribed gear, or pinion, engaging with the dents 9 of the timing belt 7 to rotate according to the rotation of the belt 7. 10 is a flexible rotation-transmitting shaft which front end is fitted fixedly into a cylinder body 11 fitted fixedly into a hollow shaft 12 of the gear 8 through a spline 13. The shaft 12 of the gear 8 is carried, through ball-bearings 14, on a carrying body 15 supported on the housing 17 of the vibrator with securing bolts 16. 18 is a vibrating shaft arranged concentrically in a running fit into the hollow portion of the hollow motive shaft 2 through ball-bearing 19, to the end of which an eccentric weight 20 is attached through an annular mounting member 21 screwed onto the front end of the vibrating shaft. 22 is a securing screw of the mounting member. The eccentric weight 20 is, in this instance, composed of a main body 23 and an eccentric adjusting plate 24 attached to the body 23 in a justaposed relation by a securing bolt 25 penetrating through in a loose fit an arc-shaped aperture 26 formed in the adjusting plate 24, to be screwed into the main body 23. The adjusting plate 24 is mounted turnably on the annular mounting member 21 and adapted to turn according to the relative movement of the bolt 25 along the arc-shaped aperture 26. Thus, loosening the bolt 25 and securing it again after suitable turning of the adjusting plate 24 enable the eccentric weight to adjust its eccentricity which results in the desired vibration effect being obtainable at any time. 27 is an aperture formed in the housing 17 and used for turning the adjusting plate 24 and the bolt 25 from the outside of the housing. 28 is a stoper flange of the bolt 25. 29 is a coupling cylinder fitted fixedly onto the rear end of the flexible shaft 10, which base portion is screwed into the screw portion 30 formed in the innermost portion of the hollow portion of the vibrating shaft 18 to accomplish the rotation transmission of the shaft 10 and 18. 31 is a bolt coupling the vibrator with the body undergoing vibration (not shown). 32 is a ball-bearing for the motive shaft 2. 33 is a oil plug for the ball-bearings 14. 34 are ring packings for oil. 35, 36 are O rings.

Figure 4:
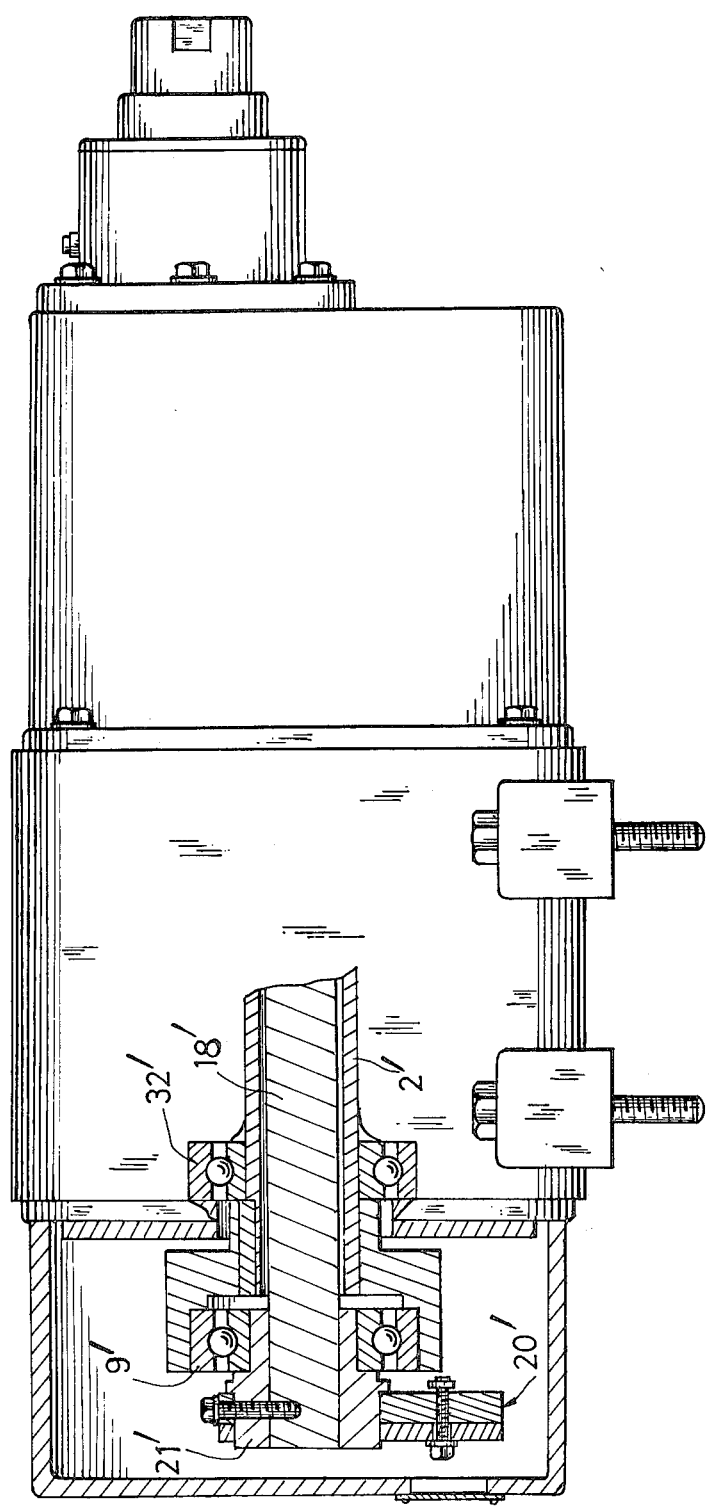
FIG. 4 is a fragmentally vertical sectional elevation of an another embodiment of the invention.

While, in the aforegoing embodiment, the rotation-transmitting means between the motive shaft and the vibrating shaft are disposed respectively front and rear sides of the motor, it may be equipped only one side thereof, i.e. either front or rear side thereof, as shown in FIG. 4. In the Figure, the right hand portion showing the configuration of the vibrator has an identical construction with the right hand sectional portion of FIG. 1. In the Figure, 32' is a ball-bearing for a motive shaft 2', 19' is a ball-bearing for a vibrating shaft 18', 20' is an eccentric weight, 21' is an annular mounting member of the eccentric weight. In these elements, 32', 19' and 20' may be the same as those of 32, 19 and 20 in FIG. 1 respectively, while the front portions of the shafts 2', 18' become naturally the same things respectively as the front portions of the shafts 2, 18 in FIG. 1.

In operation, as the motive shaft 2 of the motor starts at 3000 r.p.m. and the flexible transmitting shaft 10 rotates according to the shaft 2 at an increased speed of 9000 r.p.m. by virtue of the engaging transmission of the inscribed gear 8 and the timing belt 7, the vibrating shaft 18 turning integrally with the shaft 10 goes to rotate in the same direction as the shaft 2 which results in the actuation of the eccentric weights 20 and so high vibration of the whole body of the vibrator. Thus, the vibrator will be able to afford a desired vibration to the object to be vibrated if secured to the object by the bolt 31.

As will be understood from the aforegoing explanation, since the vibrating shaft 18 is journalled on the motive shaft 2 rotating at 3000 r.p.m. to rotate in the same direction thereas at 9000 r.p.m., the bearing 19 goes to undergo only the turning impacts of the eccentric weights produced in the time that the shaft 18 rotates at 9000−3000=6000 (r.p.m.) despite the vibration amplitude derived from the same shaft running at 9000 r.p.m. In consequence, it will be evident that the bearing portions of the vibrating shaft have the advantage of undergoing far less turning impacts owing to the eccentric weights than do the conventional ones which have been directly subjected to the same produced at 9000 r.p.m. of the motive shaft which may extend so much the useful life of the vibrator.

Besides, since the rotation-transmitting mechanism between the motive shaft and the vibrating shaft may be provided with the annular timing belt of the internal gear form and the inscribed gear engaging thereto and the flexible transmitting shaft, the vibrating shaft and the motive shaft may rotate in the same direction at such speed as the former higher than the latter under assurance of the certain transmission of rotation without any trouble. It will be noted that any other transmitting mechanisms, such as ordinary gear transmission, would be very difficult to use in this event because of their complication and the damage owing to the vibration.

Such an additional effect of the invented vibrator may be further mentioned that since the vibrator of the invention does not require the use of the conventional high cost frequency converters, it offers the possibility of so much cost saving.

I claim:

1. A vibrator characterized by comprising a hollow motive shaft penetrating through a rotor of an electric motor to project front and rear of the motor; a vibrating shaft arranged in the hollow portion of the motive shaft in concentric and rotatable relations and equipped with an eccentric weight respectively at both ends thereof and a rotation transmitting means interposed between said motive shaft and the vibrating shaft to transmit the rotation of the motive shaft to the vibrating shaft in such a manner that both the shafts rotate in the same direction and the latter rotates more speedy than the former.

2. A vibrator of claim 1 wherein said rotation transmitting means comprises an annular transmitting member fixed to one end of said motive shaft to rotate integrally and concentrically with the motive shaft; an annular timing belt of an internal gear form fitted fixedly into the inner surface of said transmitting member; an inscribed gear engaging with said timing belt to rotate according to the turning of the timing belt and a flexible rotation-transmitting shaft for transmitting the rotation of said inscribed gear to said vibrating shaft.

3. A vibration of claim 1 wherein said rotation transmitting means comprises a pair of annular transmitting members fixed severally to both ends of said motive shaft to rotate integrally and concentrically with the motive shaft; a pair of timing belts of an internal gear form severally fitted fixedly into the inner surface of said annular transmitting members; a pair of inscribed gears engaging severally with said timing belts to rotate according to the turning of the timing belts and a pair of flexible rotation-transmitting shafts for transmitting severally the rotation of said inscribed gears to said vibrating shaft.

4. A vibrator of claim 2 or 3 wherein said timing belt of an internal gear form is made of an elastic hard material.

* * * * *